United States Patent
Baylor et al.

[11] Patent Number: 5,862,158
[45] Date of Patent: Jan. 19, 1999

[54] EFFICIENT METHOD FOR PROVIDING FAULT TOLERANCE AGAINST DOUBLE DEVICE FAILURES IN MULTIPLE DEVICE SYSTEMS

[75] Inventors: Sandra Johnson Baylor, Ossining; Peter Frank Corbett, Scarsdale, both of N.Y.; Chan-ik Park, Pohang, Rep. of Korea

[73] Assignee: International Business Machines Corporation, Armonk, N.Y.

[21] Appl. No.: 601,394

[22] Filed: Feb. 14, 1996

Related U.S. Application Data

[60] Provisional application No. 60/006,343 Nov. 8, 1995.

[51] Int. Cl.[6] .................................................... G06F 11/10
[52] U.S. Cl. ................................. 371/49.1; 395/182.04
[58] Field of Search ................................ 371/49.1, 49.2, 371/21.1; 395/182, 182.04

[56] References Cited

U.S. PATENT DOCUMENTS

| | | | |
|---|---|---|---|
| 4,419,725 | 12/1983 | George et al. | 364/200 |
| 5,124,987 | 6/1992 | Milligan et al. | 371/10.1 |
| 5,233,618 | 8/1993 | Glider et al. | 371/68.1 |
| 5,309,451 | 5/1994 | Noya et al. | 371/40.4 |
| 5,315,602 | 5/1994 | Noya et al. | 371/40.4 |
| 5,333,305 | 7/1994 | Neufeld | 395/575 |
| 5,341,381 | 8/1994 | Fuller | 371/10.1 |
| 5,359,611 | 10/1994 | Parks et al. | 371/404 |
| 5,373,512 | 12/1994 | Brady | 371/40.1 |
| 5,392,244 | 2/1995 | Jacobson et al. | 365/200 |
| 5,410,667 | 4/1995 | Belsan et al. | 395/425 |

FOREIGN PATENT DOCUMENTS

| | | | |
|---|---|---|---|
| 0 569 755 A1 | 4/1993 | European Pat. Off. | G06F 12/08 |
| 0 584 804 A2 | 8/1993 | European Pat. Off. | G11B 20/12 |
| 93/13478 | 8/1993 | WIPO | G06F 11/10 |

*Primary Examiner*—Phung Chung
*Attorney, Agent, or Firm*—Robert P. Tassinari, Jr.; Ronald L. Drumheller

[57] ABSTRACT

A method for storing redundant information in an array of data storage devices such that data is protected against two simultaneous storage device failures. The method assigns each data block to two different parity sets, each protected by a different parity block. The protected data blocks and the parity block each reside on a different data storage device.

23 Claims, 4 Drawing Sheets

EFFICIENT METHOD FOR PROVIDING FAULT TOLERANCE AGAINST DOUBLE DEVICE FAILURES IN MULTIPLE DEVICE SYSTEMS

Priority is claimed from U.S. provisional application Ser. No. 60/006,343, filed on Nov. 11, 1995.

FIELD OF THE INVENTION

The invention relates to protection against loss due to failure of one or two storage devices of computer data. The storage devices may be magnetic hard disk drives such as are commonly found in computer systems, semiconductor memory devices such as are commonly found in computer systems, or any other media, be it write-once media such as some optical disk drives, or read/write media such as magnetic hard disk drives and magnetic tapes. The protection is provided through redundant data storage, using a modified parity protection scheme that protects against any two simultaneous storage device failures.

BACKGROUND OF THE INVENTION

Parity protection is used in computer systems to protect against loss of data on one storage device by computing a parity value determined by summing (usually modulo 2) data of a particular word size (usually one bit) across a number of similar storage devices holding different data, and then storing the result on an additional similar storage device. The data is then protected against the loss of any of the storage devices. In the case that the device storing the parity is lost, the parity can be regenerated from the data. In the case that one of the data devices is lost, the data can be regenerated by adding the contents of the surviving data devices together and then subtracting the result from the stored parity. In the usual case, the parity is computed on vectors one bit wide, composed of bits in corresponding positions in each of the storage devices. In this case, addition and subtraction are both equivalent to an exclusive-or logical operation, and the addition and subtraction operations are replaced by exclusive-or operations. It is also the case that when the parity is computed on vectors one bit wide, that the stored parity can be either the computed sum or its complement. These are referred to as even and odd parity respectively.

An aspect of parity protection of data is that it provides protection against only one failure. The original data can be corrected in the case of the failure of any single storage device. However, in the case of multiple simultaneous failures, no such protection is provided, and in fact such failures might not be detected.

There is a need in highly reliable computer systems to provide reliable data storage in the case of multiple failures. Such reliability is often provided by more complex coding schemes on the data. However, such coding schemes have some disadvantages. First, they may greatly increase the amount of storage space required to store the redundant data. Second, they may greatly increase the amount of time required to regenerate the redundant data when some data is modified. Third, they increase the time required to regenerate lost data when failures occur.

SUMMARY OF THE INVENTION

The present invention is a simple technique for applying parity protection to achieve protection against all single and double failures, where a single failure is the loss of one storage device, and a double failure is the loss of two storage devices at any one time. We define a data block, such that each storage device is divided into multiple data blocks of the same size. An assumption is that all storage devices are of the same size, and are divided into an integer number of data blocks. Furthermore, we define a data band to be a group of contiguous data blocks selected from the same relative position on each of the storage devices. There must be an integer number of data bands in the collection of storage devices. Each storage device is divided into a set of data stripes, where one data stripe from each storage device will together form a data band. Finally, we define a parity set to be a set of data blocks along with a single parity block such that each of the data blocks and the parity block are resident on a different storage device in the same data band and such that the parity block contains the parity computed by summing together the contents of each data block, typically by assigning each bit of each data block to a different one-bit wide vector, each vector including one bit from each block in the parity set, and performing exclusive-or sums of the components of each vector. Usually, computer hardware provides a means for computing exclusive-or operations on several bits in parallel. We refer to the data blocks and their corresponding parity block as members of a parity set. All parity sets are of equal size, the size being related to the number of storage devices and the size of the data band.

It is understood that any parity set can be completely reconstructed if and only if it has at most one missing data block or parity block. We define the number of storage devices to be N, and the size of the parity sets to be S blocks, including the parity block and S-1 data blocks. We also define M to be the number of blocks per data stripe. The present invention describes a method to ensure that each data block belongs to two different parity sets, and that for any two storage device failures at least one of these parity sets (including a block on one of the failed devices) will have S-1 surviving members, and that for all other parity sets that have only S-2 surviving members, one of the lost members can be reconstructed by first reconstructing a parity set that has S-1 surviving members, or that itself has a lost member that can be reconstructed. Generally, the technique to reconstruct the storage system after two storage devices fail is to first reconstruct those parity sets that have only one lost member. Upon completion of this reconstruction, the reconstructed block(s) will be a parity block or a data block. If it is a parity block, no further reconstruction is enabled. If it is a data block, the other parity set that data block was a member of can now be reconstructed, as it was missing at most two members and one of them has now been reconstructed.

Note that recovery from single failures is simple, as each missing member may be reconstructed from one parity set in the case of parity blocks, and either of two parity sets in the case of data blocks.

It may be observed that it is possible to protect against the failures of two storage devices by assigning each of N1×N2 storage devices to a logical two-dimensional grid of size N1×N2, and then computing the parity along each row and column of devices, storing it in N1+N2 parity devices. The problem with this technique is first that it is most applicable to systems containing a large number of storage devices, (N1+1)(N2+1)-1, since N1 and N2 are typically relatively large—on the order of 4 to 16—to reduce the portion of the total system cost taken by the redundant storage devices. Second, the fraction of the storage devices taken by parity is high, (N1+N2)/((N1+1) (N2+1)-1).

The present invention presents a technique where protection against single and double failures can be provided in systems with as few as 4 storage devices, and can be very efficiently provided in systems with 6 or more devices, depending on the acceptable ratio of parity blocks to data blocks. In these systems, the space required for parity is exactly 2 data stripes for each band for even numbers of storage devices. The known exception is 8 storage devices, for which there is no known solution requiring just two data stripes of parity data. Slightly more than 2 data stripes, 2+1/M, are required at a minimum for odd numbers of disks, where N=2M+1.

We enforce the relationship between the number of storage devices, N, and the number of disk blocks per data stripe, M, such that N=2M for even values of N, or N=2M+1, for odd values of N. It is straightforward to manipulate the size of the blocks and the total number of bands in the storage system to achieve a granularity of data and parity block size that is preferred for a given implementation.

The optimal (minimum) number of data stripes of parity data required to provide protection of all data in a data band against all double storage device failures is 2. We refer to this as space optimality. Therefore, the invention is known to allow us to achieve space optimality for many different even numbers of storage devices. For odd numbers of storage devices, N=2M+1, the invention is known to give solutions that are within a factor of (2+1/M)/2=N/(N−1) of optimal.

Furthermore, since each data block belongs to exactly two parity sets, exactly two parity blocks must be modified when each data block is modified. This is also an optimal number of modifications. This distinguishes this invention from the EVEN-ODD scheme, for example, which in many cases requires large scale modifications of parity data when a single data block is changed. We refer to this as update optimality.

The invention comprises a mechanism for assigning all data blocks in a data band to be either a parity block or a data block, with each parity block assigned to one parity set, exactly one parity block per data stripe, and the remainder of the blocks being assigned as date blocks to exactly two parity sets. The invention comprises both the observation that it is possible to generate space and update optimal and near optimal solutions for most even and odd numbers of storage devices, respectively, as well as a technique for discovering such solutions.

Space and update optimal solutions are known by the inventors for all even numbers of disks from 4 through 38, with the known exception of 8 disks. Update optimal solutions are known for odd numbers of disks from 3 through 37, with space usage being near optimal at 2+1/M, where N=2M+1.

DETAILED DESCRIPTION OF THE INVENTION

The invention is a technique for assigning data and parity blocks to parity sets in a storage system with multiple storage devices. Systems organized according to patterns generated using the method of this invention are protected against all simultaneous failures of any two storage devices. They are also protected against all single failures of any storage devices.

We consider the invention in terms of disk systems, although it is clear that the invention is equally applicable to any other media used to store computer data. We assume that the disk system is composed of N disks, each divided into M blocks. It is clear that the disks could equally well be divided into an integer number of bands of M blocks, with the parity and data block assignment patterns repeated for each band, to reduce the size of the blocks to a preferred size for an implementation. Also, it is clear that larger disk systems can be composed of groups of smaller disk systems. However, the invention applies to disk systems of any number of devices greater than 4.

The invention describes the assignment of each of the blocks of each disk to be a parity block or a data block. Exactly one block per disk is defined to be a parity block. While the invention will describe a block in a particular position on the disk to be the parity block for each specific disk, it is clear that the parity block could be arbitrarily assigned to be any of the blocks on the disk. Each parity block stores the parity for one parity set, and each parity set has exactly one parity block. All parity sets are of equal size and are composed, in addition to the parity block, of several data blocks.

All blocks other than the parity blocks are assigned to be data blocks, storing user data that can be read, and in some cases, written, by users of the storage system. Each data block is defined to be a member of exactly two parity sets. It is a property of the invention that no two data blocks in the system are both members of the same two parity sets. It is a requirement of the invention that no more than one data block or parity block on any given disk will belong to any one parity set. While the invention will define each data block in a particular position on a disk to be a member of two specific parity sets, it is clear that the data blocks on a disk can be permuted so that the data block assigned to two specific parity sets can be found in any position on the disk.

In Table 1, we see demonstrated for a system of 4 disks (each disk represented by a column of the table) a solution of the invention where each disk contains one data block and one parity block. In the case of any single failure, no parity set is missing more than one block, and therefore all parity sets, and consequently all missing blocks, can be reconstructed.

TABLE 1

| Disk 0 | Disk 1 | Disk 2 | Disk 3 |
|--------|--------|--------|--------|
| P0     | P1     | P2     | P3     |
| D12    | D23    | D30    | D01    |

In Table 1, each column describes for a disk the assignment of blocks to be either parity or data blocks (with "P" indicating parity, and "D" indicating data), and the assignment of those parity and data blocks to a parity set.

It is easy to see that if any one disk fails, the lost data and parity blocks can be reconstructed, since at most one block is missing from all parity sets. It can also be demonstrated that if any two disks fail, all the missing blocks can be generated from the remaining parity and data on the other two disks. For example, if disk 1 and 2 fail, then we see that parity sets 2 and 3 are each missing two blocks, and cannot be reconstructed immediately (see Table 2). However, parity sets 0 and 1 are each missing only one block, and therefore, the missing blocks can be reconstructed. This can be done sequentially or simultaneously.

TABLE 2

| Disk 0 | Disk 1 | Disk 2 | Disk 3 |
| --- | --- | --- | --- |
| P0 | X | X | P3 |
| D12 | X | X | D01 |

Upon completion of this reconstruction, the disk system is in a state as shown in Table 3.

TABLE 3

| Disk 0 | Disk 1 | Disk 2 | Disk 3 |
| --- | --- | --- | --- |
| P0 | P1 | X | P3 |
| D12 | X | D30 | D01 |

Now, we have enough information to reconstruct parity set 3, as shown in Table 4.

TABLE 4

| Disk 0 | Disk 1 | Disk 2 | Disk 3 |
| --- | --- | --- | --- |
| P0 | P1 | X | P3 |
| D12 | D23 | D30 | D01 |

Finally, we now have enough information to reconstruct parity set 2, returning the disk system to its original state as in Table 1.

We now consider that another pair of disks fail, for example disks 0 and 2, as shown in Table 5

TABLE 5

| Disk 0 | Disk 1 | Disk 2 | Disk 3 |
| --- | --- | --- | --- |
| X | P1 | X | P3 |
| X | D23 | X | D01 |

We see that parity sets 1 and 3 can be reconstructed immediately, giving the result of Table 6.

TABLE 6

| Disk 0 | Disk 1 | Disk 2 | Disk 3 |
| --- | --- | --- | --- |
| X | P1 | X | P3 |
| D12 | D23 | D30 | D01 |

Now we see that parity sets 0 and 2 can be reconstructed, again returning the system to its state in Table 1.

We assume that there are N disks and N parity sets, with M blocks such that block 0 of disk i is the parity block of parity set i, and that for each other disk block $b_{1-m}$ of disk i, if block j ($1<j\leq M$) is in parity sets k and 1, then block j of disk (+1) mod N is in parity sets (k+1) mod N and (1+1) mod N.

It can be seen that by considering one double failure of two adjacent disks and one double failure of two disks that are spaced two-apart, that we have considered cases equivalent to all possible double disk failures. This is because all double disk failures must be either of adjacent disks, or of non-adjacent disks. Since the blocks were assigned to parity sets in a cyclic pattern (as described later), all failures of adjacent disks must be recoverable, as we have shown that one such failure is recoverable, and all other failures of adjacent disks are isometric to this one such failure. Similarly for failures two-apart. In general, in a system of N disks, disks separated by 0 up to (N–1)/2 disks must be checked to ensure that their failures can be recovered from. To show that not all patterns of block assignments to parity sets can be recovered from, consider the disk system with parity set assignments as shown in Table 7.

TABLE 7

| Disk 0 | Disk 1 | Disk 2 | Disk 3 |
| --- | --- | --- | --- |
| P0 | P1 | P2 | P3 |
| D13 | D20 | D31 | D02 |

If disk 1 and 3 fail, the result is as shown in Table 8:

TABLE 8

| Disk 0 | Disk 1 | Disk 2 | Disk 3 |
| --- | --- | --- | --- |
| P0 | X | P2 | X |
| D13 | X | D31 | X |

Parity sets 1 and 3 can be reconstructed to give Table 9:

TABLE 9

| Disk 0 | Disk 1 | Disk 2 | Disk 3 |
| --- | --- | --- | --- |
| P0 | P1 | P2 | P3 |
| D13 | X | D31 | X |

No further reconstruction is possible.

In general, for larger N and M, it becomes more difficult to find patterns of parity set assignments that will allow recovery from all double disk failures.

We now describe a method for finding parity assignment patterns that will allow recovery from double disk failures.

We define a parity assignment vector as a vector containing N symbols, where N is, again, also the number of disks in the system. Of these symbols, one is "p" and the remaining symbols include two each of the numerical digits from 1 to M–1, where M is the number of blocks per disk. The remaining symbols are 0. For example, if N=10 and M=5, then examples of possible parity assignment vectors include:

p 0 1 1 2 2 3 3 4 4, 1 0 2 1 3 4 3 p 4 2, and 0 4 3 2 1 1 2 3 4 p.

We next define a parity assignment matrix, where the matrix has N rows, each row of which consists of an identical parity assignment vector, but rotated to a different position.

For example, for the first assignment vector given above, the parity assignment matrix would be shown in Table 10:

TABLE 10

| Parity Set |
| --- |
| 0 1 2 3 4 5 6 7 8 9 |
| Disk 0: p 0 1 1 2 2 3 3 4 4 |
| 1: 4 p 0 1 1 2 2 3 3 4 |
| 2: 4 4 p 0 1 1 2 2 3 3 |
| 3: 3 4 4 p 0 1 1 2 2 3 |
| 4: 3 3 4 4 p 0 1 1 2 2 |

TABLE 10-continued

| Parity Set |
| --- |
| 0 1 2 3 4 5 6 7 8 9 |
| 5: 2 3 3 4 4 p 0 1 1 2 |
| 6: 2 2 3 3 4 4 p 0 1 1 |
| 7: 1 2 2 3 3 4 4 p 0 1 |
| 8: 1 1 2 2 3 3 4 4 p 0 |
| 9: 0 1 1 2 2 3 3 4 4 p |

In the parity assignment matrix of Table 10, each column represents a parity set, and each row represents a disk. The value of matrix element [r,c] indicates that for disk r, the block M [r,c] is assigned to parity set c. If M[r,c]=0, there is no assignment of any block on disk r to the parity set c. If M[r,c]=p, then disk r will hold the parity block of parity set c. If M[r,c]=1 . . . M−1, then data block D(M[r,c]) of that disk belongs to parity set c. Note that for each disk, each data block of that disk is assigned to two different parity sets by this method.

At this point, it should be noted that the parity sets are of size S where S=1+2(M−1)=2M−1. In general, the technique can be applied to any N>=2M. It is generally easier to find correct solutions for values of N>2M than it is for N=2M. In fact, for N=8 and M=4, no correct solution can be found. For N>2M, space optimality is lost, as the amount of parity is (N/M)>2. However, if disk space is not a prime consideration, this deviation from space optimality may be acceptable to the implementor of a disk system.

It will be understood that after data has been stored, parity sets assigned, and parity blocks computed and stored (i.e., at steady state), parity blocks can be recomputed in the event of data modification as follows.

$$\Delta Parity = Data_{old} \oplus Data_{new}$$

$$Partity_{new} = Parity_{old} \oplus \Delta Parity.$$

The next part of the invention is a description of how to quickly test if a particular parity assignment vector will allow complete reconstruction from all double disk failures.

To do this, we first place a copy of a parity assignment vector adjacent to a rotated copy of itself. (Each column represents data blocks that are in the same parity set.) The amount of rotation is between 1 and ceiling(N/2) positions. For example, as shown in Table 11:

TABLE 11

| p | 0 | 1 | 1 | 2 | 3 | 4 | 2 | 4 | 3 |
| --- | --- | --- | --- | --- | --- | --- | --- | --- | --- |
| 3 | p | 0 | 1 | 1 | 2 | 3 | 4 | 2 | 4 |

The two vectors in Table 11 are rotated one position with respect to each other. They represent adjacent pairs of disks. We first note that in a position where one of the vectors has a zero value, there is no assignment of any block on that disk to the parity set of that column. Therefore the block of the other disk that is in that same parity set can be immediately reconstructed. We denote this by placing a mark above or below that vector element in Table 12. We place a similar mark above or below the 0 values in the vector, as there is no reconstruction required since that disk is not a member of that parity set.

TABLE 12

| * | * |   |   |   |   |   |   |   |   |
| --- | --- | --- | --- | --- | --- | --- | --- | --- | --- |
| p | 0 | 1 | 1 | 2 | 3 | 4 | 2 | 4 | 3 |
| 3 | p | 0 | 1 | 1 | 2 | 3 | 4 | 2 | 4 |
|   | * | * |   |   |   |   |   |   |   |

Now we note that in the first vector, data block 1 has been reconstructed, so we place a mark over the other 1 symbol in the vector, as shown in Table 13.

TABLE 13

| * | * | * |   |   |   |   |   |   |   |
| --- | --- | --- | --- | --- | --- | --- | --- | --- | --- |
| p | 0 | 1 | 1 | 2 | 3 | 4 | 2 | 4 | 3 |
| 3 | p | 0 | 1 | 1 | 2 | 3 | 4 | 2 | 4 |
|   | * | * |   |   |   |   |   |   |   |

Now, in the second vector, we can reconstruct data block 1, as shown by the marks in Table 14.

TABLE 14

| * | * | * |   |   |   |   |   |   |   |
| --- | --- | --- | --- | --- | --- | --- | --- | --- | --- |
| p | 0 | 1 | 1 | 2 | 3 | 4 | 2 | 4 | 3 |
| 3 | p | 0 | 1 | 1 | 2 | 3 | 4 | 2 | 4 |
|   | * | * | * |   |   |   |   |   |   |

We can now reconstruct data block 2 in the first vector, as shown in Table 15.

TABLE 15

| * | * | * | * |   |   |   |   |   |   |
| --- | --- | --- | --- | --- | --- | --- | --- | --- | --- |
| p | 0 | 1 | 1 | 2 | 3 | 4 | 2 | 4 | 3 |
| 3 | p | 0 | 1 | 1 | 2 | 3 | 4 | 2 | 4 |
|   | * | * | * |   |   |   |   |   |   |

Now, data block 4 of the second vector can be reconstructed as shown in Table 16.

TABLE 16

| * | * | * | * |   |   | * |   |   |   |
| --- | --- | --- | --- | --- | --- | --- | --- | --- | --- |
| p | 0 | 1 | 1 | 2 | 3 | 4 | 2 | 4 | 3 |
| 3 | p | 0 | 1 | 1 | 2 | 3 | 4 | 2 | 4 |
|   | * | * | * |   |   | * |   |   | * |

Continuing in a similar fashion, we eventually can mark above or below all the elements of each vector, as shown in Table 17.

TABLE 17

| * | * | * | * | * | * | * | * | * | * |
| --- | --- | --- | --- | --- | --- | --- | --- | --- | --- |
| p | 0 | 1 | 1 | 2 | 3 | 4 | 2 | 4 | 3 |
| 3 | p | 0 | 1 | 1 | 2 | 3 | 4 | 2 | 4 |
| * | * | * | * | * | * | * | * | * | * |

This indicates that with the parity assignment vector above, all failures of adjacent disks can be recovered from. We repeat the process for all rotations up to ceiling(N/2). If, in all cases, all the vector elements can be marked by this method, then the parity assignment vector can be used to give an assignment of blocks to parity sets that allows reconstruction from all double disk failures.

An example of a parity assignment vector where this is not true is:

| p | 0 | 1 | 1 | 2 | 3 | 2 | 4 | 3 | 4 |
|---|---|---|---|---|---|---|---|---|---|

Since (Table 18):

TABLE 18

| p | 0 | 1 | 1 | 2 | 3 | 2 | 4 | 3 | 4 |
|---|---|---|---|---|---|---|---|---|---|
| 4 | 3 | 4 | p | 0 | 1 | 1 | 2 | 3 | 2 | lets us reconstruct no farther than what is shown in Table 19:

TABLE 19

|   | * |   |   | * | * | * |   | * |   |
|---|---|---|---|---|---|---|---|---|---|
| p | 0 | 1 | 1 | 2 | 3 | 2 | 4 | 3 | 4 |
| 4 | 3 | 4 | p | 0 | 1 | 1 | 2 | 3 | 2 |
|   | * |   |   | * | * | * |   | * |   |

There is no way to reconstruct blocks p, 1, or 4 of the first disk, and blocks 4, p or 2 of the second disk.

In general, the technique to check if a parity assignment vector will give a recoverable assignment of parity to a disk system is as follows:

```
Procedure
{
    For each value i = 1 to ceiling ( N/2 ):
    {
        Superimpose two copies of the parity assignment vector
        such that one is rotated by i positions with respect to the
other
        Mark each zero element in each vector.
        Mark each vector element that is opposite a zero in the other
vector.
        Repeat until no more elements can be marked:
        {
            Mark the element of the same value 1 to M - 1 as any
element already marked in a vector.
            Mark any elements opposite a newly marked element in the
other vector.
        }
        If any element remains unmarked:
            Exit with failure
    }
Exit with success
}
```

To demonstrate how a successful parity assignment vector is used to assign parity and data blocks on a disk to parity sets, we present a successful parity assignment vector for N=6, M=3.

| p | 1 | 0 | 1 | 2 | 2 |
|---|---|---|---|---|---|

The parity assignment matrix, with disk numbers and parity sets shown on the periphery is shown in Table 20:

TABLE 20

|         | Parity Set |   |   |   |   |   |
|---------|---|---|---|---|---|---|
|         | 0 | 1 | 2 | 3 | 4 | 5 |
| Disk 0: | p | 1 | 0 | 1 | 2 | 2 |
| 1:      | 2 | p | 1 | 0 | 1 | 2 |
| 2:      | 2 | 2 | p | 1 | 0 | 1 |
| 3:      | 1 | 2 | 2 | p | 1 | 0 |

TABLE 20-continued

|         | Parity Set |   |   |   |   |   |
|---------|---|---|---|---|---|---|
|         | 0 | 1 | 2 | 3 | 4 | 5 |
| 4:      | 0 | 1 | 2 | 2 | p | 1 |
| 5:      | 1 | 0 | 1 | 2 | 2 | p |

This gives the disk block arrangement shown in Table 21:

TABLE 21

| Disk 0 | Disk 1 | Disk 2 | Disk 3 | Disk 4 | Disk 5 |
|---|---|---|---|---|---|
| P0  | P1  | P2  | P3  | P4  | P5  |
| D13 | D24 | D35 | D40 | D51 | D02 |
| D45 | D50 | D01 | D12 | D23 | D34 |

Having demonstrated the technique for finding an assignment of parity and data blocks to parity sets that will yield a disk system capable of recovering from any two disk errors, it will be clear to those skilled in the art that such patterns can be discovered for a particular combination of N and M, N>=2M, by use of a computer program written to find such patterns by searching through the set of possible parity assignment vectors. While the search space is large, it is relatively easy to prune the search space, to improve the speed of the program. It is also possible to find successful parity assignment vectors manually, although it is difficult to do so for larger values of M with $N \geq 3M$. Simple constructions are possible for $N \geq 3M$.

As will be clear to those skilled in the art, the invention can be extended to protect against three or more device failures.

Figure 1:
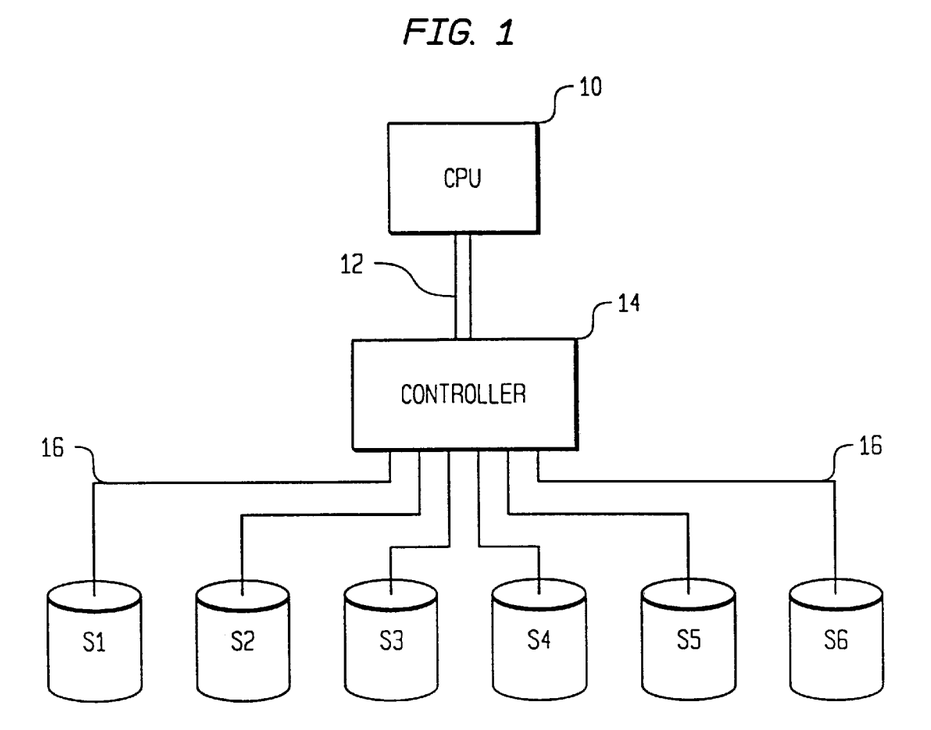
FIG. 1 is a system on which the method of the invention can operate advantageously.
Figure 2:
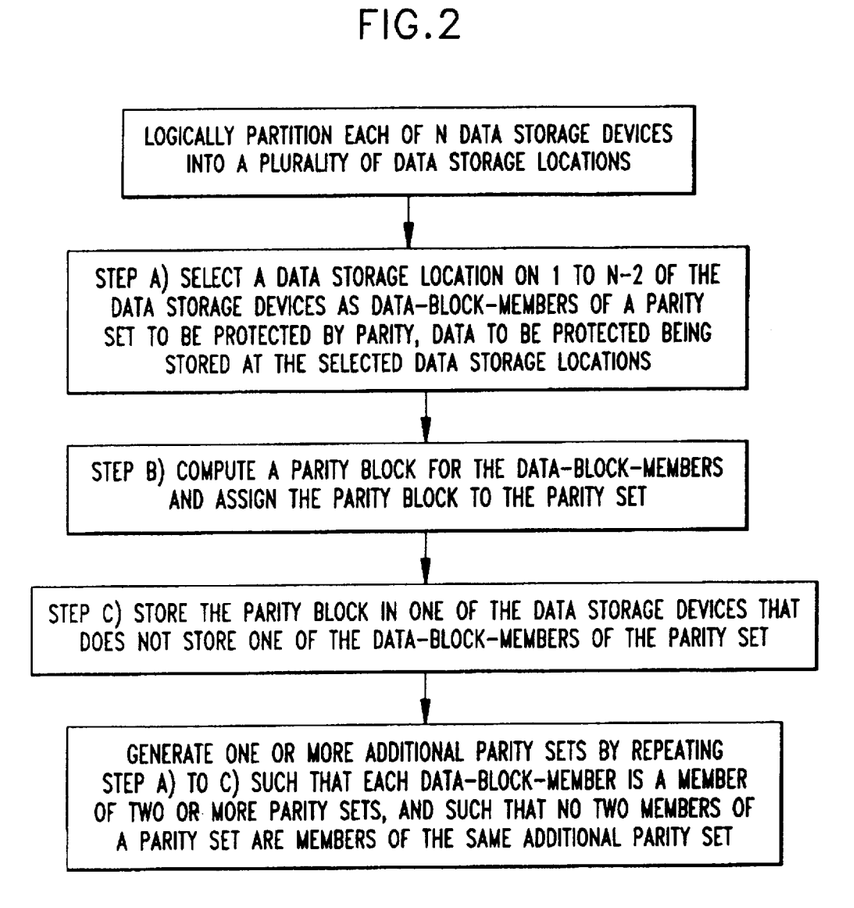
FIG. 2 is a flow diagram of one embodiment of the method of this invention.
Figure 3:
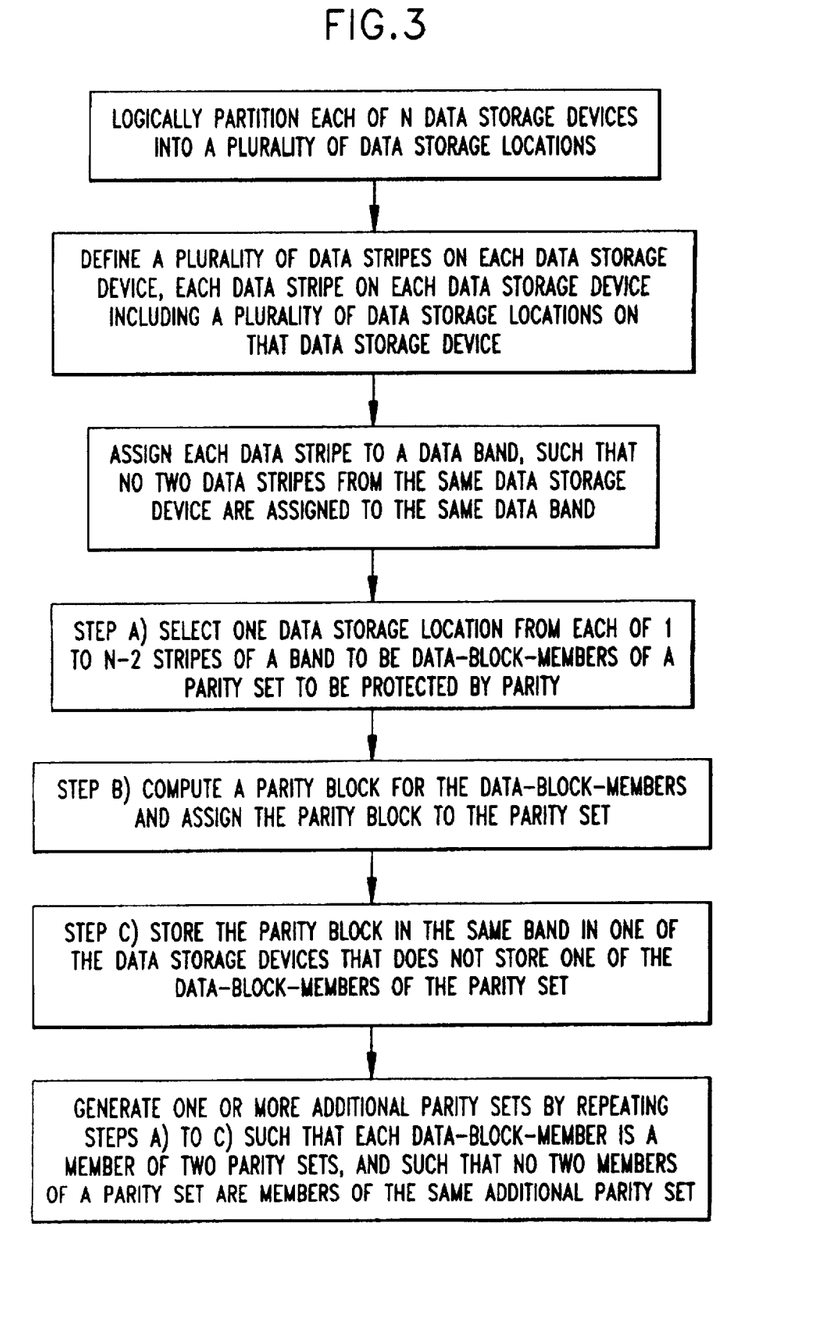
FIG. 3 is a flow diagram of a second embodiment of the method of this invention.
Figure 4:
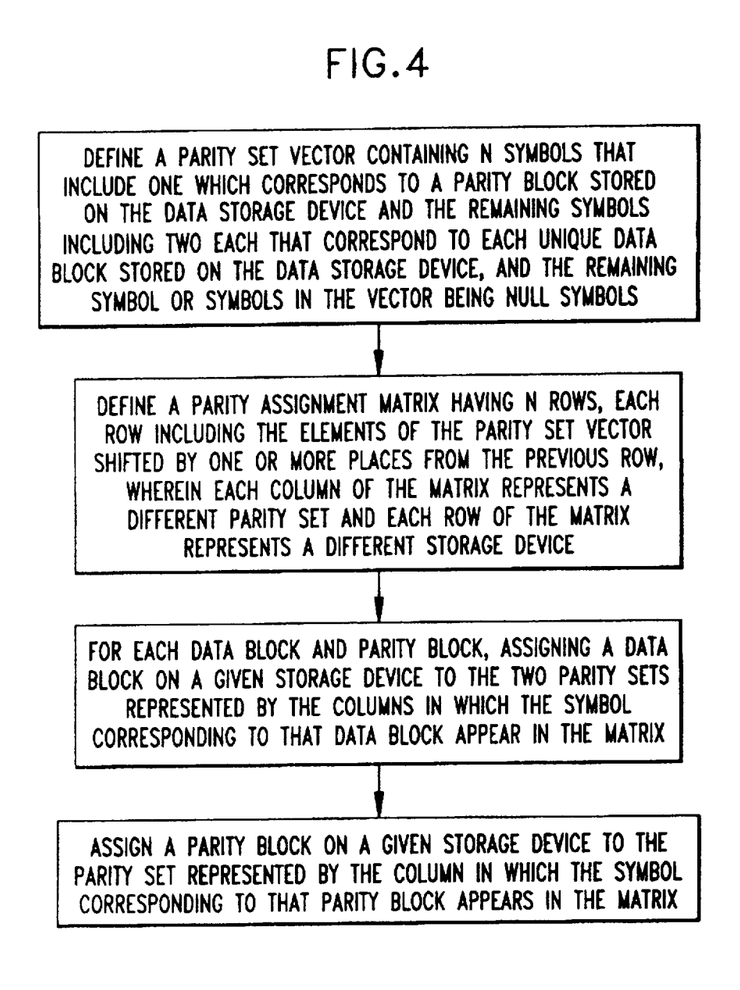
FIG. 4 is a flow diagram of a cyclic method of assigning members to each of the parity sets in accordance with this invention.

The invention can be implemented as software running on a general purpose computer. When computation of parity set assignment is complete, the assignments can be implemented as part of the file system of a multiple storage device system. Such a system is shown in FIG. 1. FIG. 1 shows a system including a redundant array of data storage devices, such as disks. A CPU 10 is coupled to disk array controller 14 via a bus 12. Control signals are sent to the disks S1–S6 from the controller 14 via lines 16. The controller preferably will include its own processor and memory suitable for controlling the assignment and tracking of data and parity blocks to the various disks.

While the invention has been described particularly with respect to preferred embodiments thereof, it will be understood that modifications to the disclosed embodiments without departing from the spirit and scope of the invention.

We claim:

1. A method for protecting against single and double storage device failures in a group of N storage devices, comprising:

logically partitioning each of the storage devices into a plurality of data storage locations;

a) selecting a data storage location on 1 to N-2 of the data storage devices to be data-block-members of a parity set to be protected by parity, the selected data storage locations storing data to be protected;

b) computing a parity block for the data-block-members and assigning the parity block to the parity set;

c) storing the parity block in one of the storage devices that does not store one of the data-block-members of the parity set;

generating one or more additional parity sets by repeating steps a)–c) such that each data-block-member is a member of two or more parity sets, and such that no two members of a parity set are members of the same additional parity set.

2. The method of claim 1, wherein each data storage location is the same size.

3. The method of claim 1, wherein the data storage devices are disks in an array of disks.

4. The method of claim 1, wherein each device includes M data locations, and wherein N is greater than or equal to 2M.

5. The method of claim 1, wherein each data-block-member is a member of three or more parity sets.

6. A method for protecting against single and double storage device failures in a group of N storage devices, comprising:

logically partitioning each of the storage devices into a plurality of data storage locations;

defining a plurality of data stripes on each storage device, each data stripe on each data storage device comprising a plurality of data storage locations on that data storage device;

assigning each data stripe to a data band, such that no two data stripes from the same storage device are assigned to the same data band;
   a) selecting one data storage location from each of 1 to N−2 stripes of a band to be data-block-members of a parity set to be protected by parity;
   b) computing a parity block for the data-block-members and assigning the parity block to the parity set;
   c) storing the parity block in the same band in one of the storage devices that does not store one of the data-block-members of the parity set;

generating one or more additional parity sets by repeating steps a)–c) such that each data-block-member is a member of two parity sets, and such that no two members of a parity set are members of the same additional parity set.

7. The method of claim 6, wherein each data stripe in a data band contains the same number of data storage locations.

8. The method of claim 6, wherein each data storage device contains the same number of data stripes.

9. The method of claim 6, wherein the data storage devices are disks in an array of disks.

10. The method of claim 6, wherein each data storage device has the same number of data storage locations.

11. The method of claim 6, wherein the parity block of a parity set is computed by XORing each of the data-block-members of the parity set.

12. The method of claim 6, wherein each parity set has the same number of members.

13. The method of claim 6, wherein the members of each parity set are assigned in a cyclic pattern.

14. The method of claim 13, wherein the cyclic pattern is determined as follows:

defining a parity set vector containing N symbols that include one which corresponds to a parity block stored on the data storage device and the remaining symbols including two each that correspond to each unique data block stored on the data storage device, and the remaining symbol or symbols in the vector being null symbols;

defining a parity assignment matrix having N rows, each row comprising the elements of the parity set vector shifted by one or more places from the previous row, wherein each column of the matrix represents a different parity set and each row of the matrix represents a different storage device;

for each data block and parity block:
   assigning a data block on a given storage device to the two parity sets represented by the columns in which the symbol corresponding to that data block appears in the matrix;
   assigning a parity block on a given storage device to the parity set represented by the column in which the symbol corresponding to that parity block appears in the matrix.

15. The method of claim 14, further comprising permuting the device assignments after the steps of assigning a data block and assigning a parity block.

16. The method of claim 14, further comprising permuting the symbols that correspond to the parity blocks and the data blocks.

17. The method of claim 14, further comprising permuting the data blocks on a device.

18. A method for assigning parity and data blocks to a parity set to insure recovery from single and double storage device failures in a system having a plurality of data storage devices, comprising the steps of:

assigning one of N unique symbols to each storage device;

partitioning each storage device into M different data blocks, and assigning each data block a unique symbol;

defining a parity set vector containing N symbols that include one which corresponds to a parity block stored on the data storage device and the remaining symbols including two each that correspond to each unique data block symbol stored on the data storage device, and the remaining symbol or symbols in the vector being null symbols;

defining a parity assignment matrix having N rows, each row comprising the elements of the parity set vector shifted by one or more places from the previous row, wherein each column of the matrix represents a different parity set and each row of the matrix represents a different storage device;

for each data block and parity block:
   assigning a data block on a given storage device to the two parity sets represented by the columns in which the symbol corresponding to that data block appears in the matrix;
   assigning a parity block on a given storage device to the parity set represented by the column in which the symbol corresponding to that parity block appears in the matrix.

19. The method of claim 18 further comprising:

computing a parity for the data blocks in a parity data set; and storing the parity in the parity block of the parity set.

20. The method of claim 18, wherein the parity is computed by XORing the data blocks of the parity set.

21. The method of claim 18, wherein N is greater than or equal to 2M.

22. The method of claim 18, wherein each data storage device is a disk in a redundant array of disks.

23. A system for protecting against single and double storage device failures in a group of N storage devices, comprising:

means for logically partitioning each of the storage devices into a plurality of data storage locations;

a) means for selecting a data storage location on 1 to N-2 of the data storage devices to be data-block-members of a parity set to be protected by parity, the selected data storage locations storing data to be protected;

b) means for computing a parity block for the data-block-members and assigning the parity block to the parity set;

c) means for storing the parity block in one of the storage devices that does not store one of the data-block-members of the parity set; and means for generating one or more additional parity sets by repeating steps a)–c) such that each data-block-member is a member of two parity sets, and such that no two members of a parity set are members of the same additional parity set.

* * * * *